Figure 3:
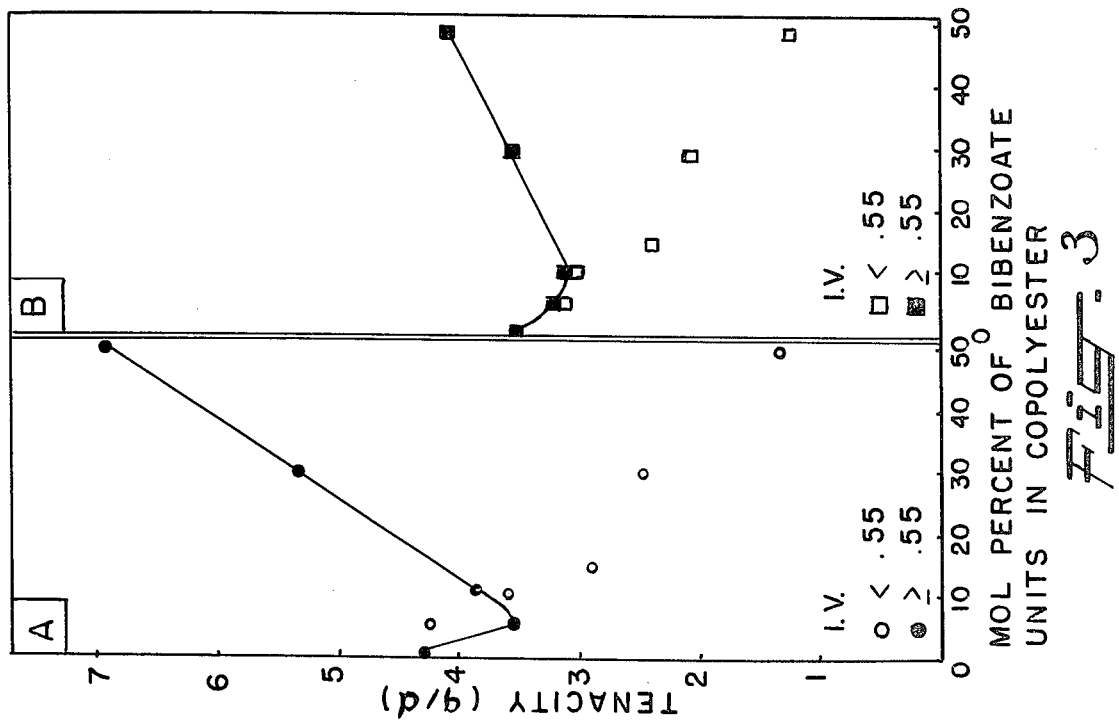

United States Patent [19]

Knopka

[11] 4,082,731

[45] Apr. 4, 1978

[54] METHOD FOR PRODUCING A HIGH MODULUS POLYESTER YARN

[75] Inventor: William N. Knopka, Medford, N.J.

[73] Assignee: Avtex Fibers Inc., Valley Forge, Pa.

[21] Appl. No.: 644,388

[22] Filed: Dec. 29, 1975

Related U.S. Application Data

[63] Continuation-in-part of Ser. No. 331,652, Feb. 12, 1973, abandoned.

[51] Int. Cl.² .............................................. C08G 63/12
[52] U.S. Cl. .............................. 260/75 T; 260/75 R; 264/210 F; 264/235; 264/290 T; 264/342 RE
[58] Field of Search .................... 260/47 C, 860, 75 R, 260/75 T; 264/290 T, 103, 235

[56] References Cited

U.S. PATENT DOCUMENTS

| | | | |
|---|---|---|---|
| 2,734,794 | 2/1956 | Calton | 264/290 T |
| 3,007,900 | 11/1961 | Lytton | 260/47 C |
| 3,008,934 | 11/1961 | Wielicki | 260/75 T |
| 3,705,225 | 12/1972 | Taylor | 264/103 |
| 3,767,756 | 10/1973 | Blades | 264/164 |
| 3,888,965 | 6/1975 | Kwolek | 264/164 |

Primary Examiner—Jay H. Woo
Attorney, Agent, or Firm—Arthur R. Eglington

[57] ABSTRACT

Method taught for producing a high modulus yarn of filaments of a polyester resin consisting of at least 15 up to 50 mole percent of bibenzoate units and from 85 to 50 mole percent of terephthalate units, said yarn having been uniformly oriented and then heat-set while free-to-relax.

12 Claims, 3 Drawing Figures

METHOD FOR PRODUCING A HIGH MODULUS POLYESTER YARN

CROSS REFERENCE TO RELATED APPLICATIONS

This is a continuation-in-part of my copending application Ser. No. 331,652, filed Feb. 12, 1973 now abandoned.

High modulus yarns of polyester resin filaments are well-known. They are advantageously employed either alone or in blends with other fibers, such as cotton, to produce textile fabrics having greater tensile strength, abrasion resistance and fabric durability. The procedure for obtaining high modulus polyethylene terephthalate yarns is set forth, for example, in U.S. Pat. Nos. 3,044,250 and 3,177,555. These patents indicate that the preparation of high modulus synthetic resin textile yarns, particularly in the manufacture of staple fibers, must include the step of heat-setting the uniformly oriented yarn under tension. It is known, that the heat-setting of yarn without tension or in a free to completely relax condition gives a yarn with a significantly lower initial modulus. For example, in the U.S. Pat. No. 2,734,794, a product having much lower abrasion resistance is obtained without this necessary step.

It would be advantageous from a processing standpoint, to produce high modulus polyester yarn without the conventional step of heat-setting the yarn while held under tension. This permits the use of the same or similar processing equipment for the manufacture of high modulus polyester staple fibers and regular polyester staple fibers. Since the equipment required for producing high modulus polyester is extremely expensive and represents a large capital investment, as well as the related high energy costs, the elimination of this requirement would allow the production of high modulus fiber at a lower cost.

The modulus of concern in this specification is defined in the aforementioned U.S. Pat. No. 3,044,250 to Hebeler as the load-elongation value for a synthetic fiber. Thus, it is a function of yarn-elongation and resulting tenacity (as depicted by stress-strain curves) and is expressed in grams per denier. High modulus yarn as described herein has an initial modulus exceeding 50 grams per denier, as measured after heat-setting, as well as before heat setting.

It is a primary object of this invention to provide high modulus polyester yarn which has been heat-set without tension.

This and other objects are accomplished in accordance with this invention which is a high modulus yarn of filaments of a copolyester resin consisting from at least 15 up to 50, preferably from 25 to 40 mole percent of an interpolymerized randomly repeating unit having the formula:

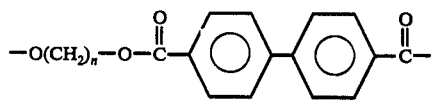

and from 85 to 50, preferably from 75 to 60 mole percent of an interpolymerized randomly repeating unit having the formula:

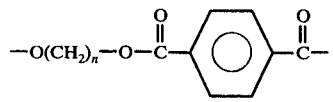

wherein $n$ is an integer of 2 to 10, preferably from 2 to 4, said yarn having been uniformly oriented and heat-set while free-to-relax.

The randomly repeating unit having the formula:

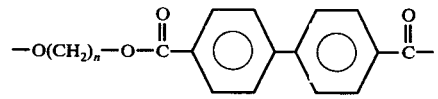

is derived from bibenzoic acid, or an ester-forming derivative thereof, and an alkylene glycol having the formula:

$HO-(CH_2)_n-OH$, wherein $n$ is an integer of from 2 to 10, preferably 2 to 4.

The repeating unit having the formula:

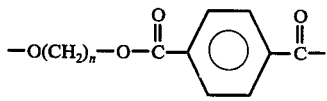

is derived from terephthalic acid, or an ester-forming derivative thereof, and the above-described alkylene glycol.

The copolyester resin fibers of this invention are those having intrinsic viscosities (I.V.) of about 0.55 and higher, preferably at least 0.6 (determined in a 60 weight % phenol and 40 weight % tetrachloroethane solution at 30° C.)

In addition to the above interpolymerized components, the copolyester can have up to about 5 mole percent of another interpolymerized randomly repeating unit present which is monofunctional or difunctional as long as the terephthalate unit is present in an amount of about 50 mole percent and the additional interpolymerized unit does not affect the high modulus property of the resin. Examples of other components which are useful in the copolyester include, for example, those which lend cationic dyeability to the resin, particularly the mono- or di-functional alkali metal-sulfonated aromatic esters, and those which lend disperse dyeability to the resin, particularly succinic acid esters and higher homologues thereof.

The copolyester resins of this invention are prepared by known methods, for example, as shown in U.S. Pat. No. 3,008,934. The two most commonly employed methods are the so-called transesterification method and the direct esterification method. In the former, lower alkanol diesters are reacted with a glycol and the product polycondensed. In the latter, the diacids are reacted directly with a glycol and the product polycondensed. Suitable catalysts are employed for either transesterification or direct esterification and for polycondensation.

As is well-known, various additives are incorporated in the resin either before completion of its manufacture of thereafter. Additives which are employed include, for example, heat and light stabilizers, antioxidants, antistatic agents, plasticizers, dyes, pigments and the like.

The high modulus yarns of this invention are produced by conventional melt spinning of the resin into fibers. The fibers are oriented, usually in tow form, and preferably in a manner similar to that described in U.S. Pat. No. 2,918,346.

The resultant yarn in tow is then heat-set by passage through a heat zone in a free-to-relax condition. The term "free-to-relax" defines a condition wherein the yarn is completely free of tension during the heat-setting step. Heating means for heat-setting the yarn can be any means which will bring the yarn temperature sufficiently high but less than its melting point, and maintain said temperature for sufficient time, to stabilize the yarn and increase the degree of crystallization of the resin. Hot air, steam, infra-red heat or the like are suitably used, as is well-known in this art, to supply heat for stabilizing the yarn. The preferred temperature range for heat-setting the yarn of this invention is from about 125° to 185° C. for a time ranging from 1 to 10 minutes.

Figure 1:
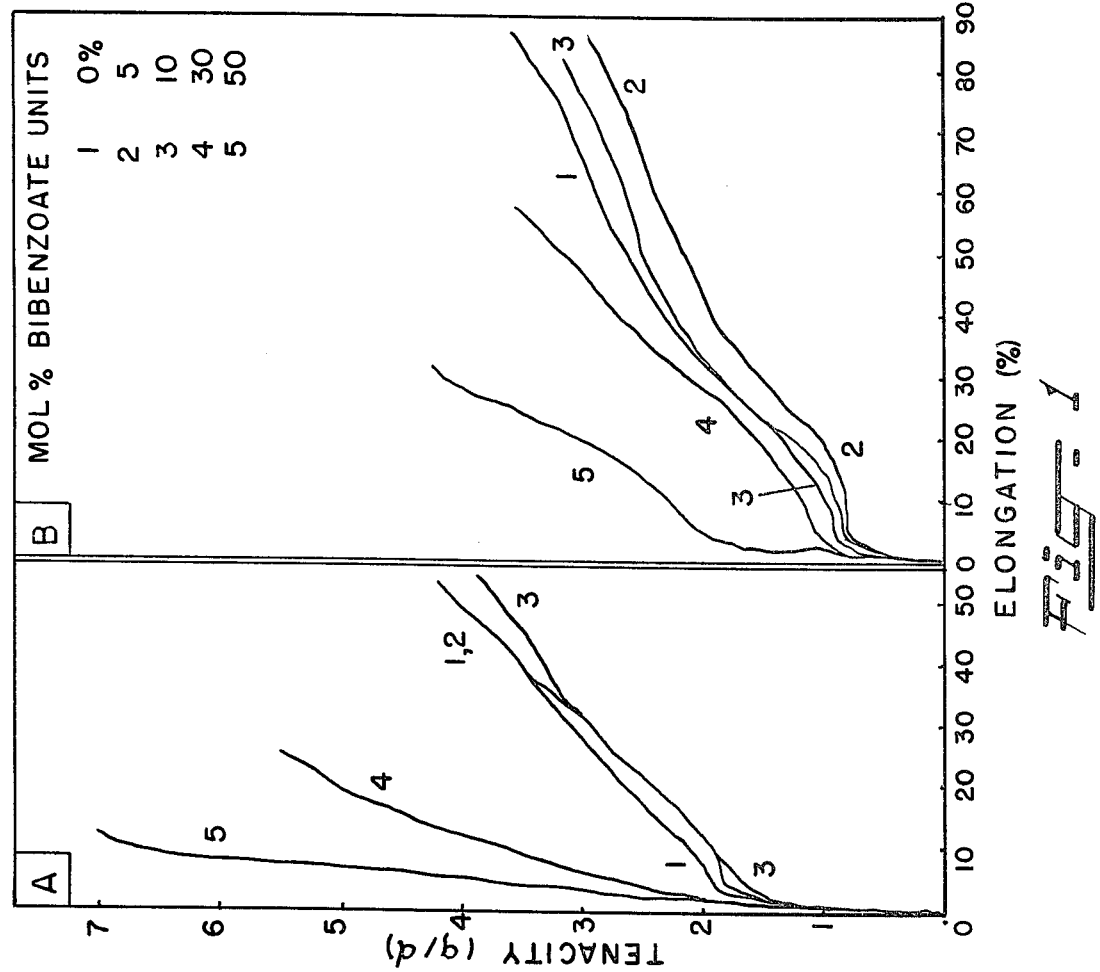
Figure 2:
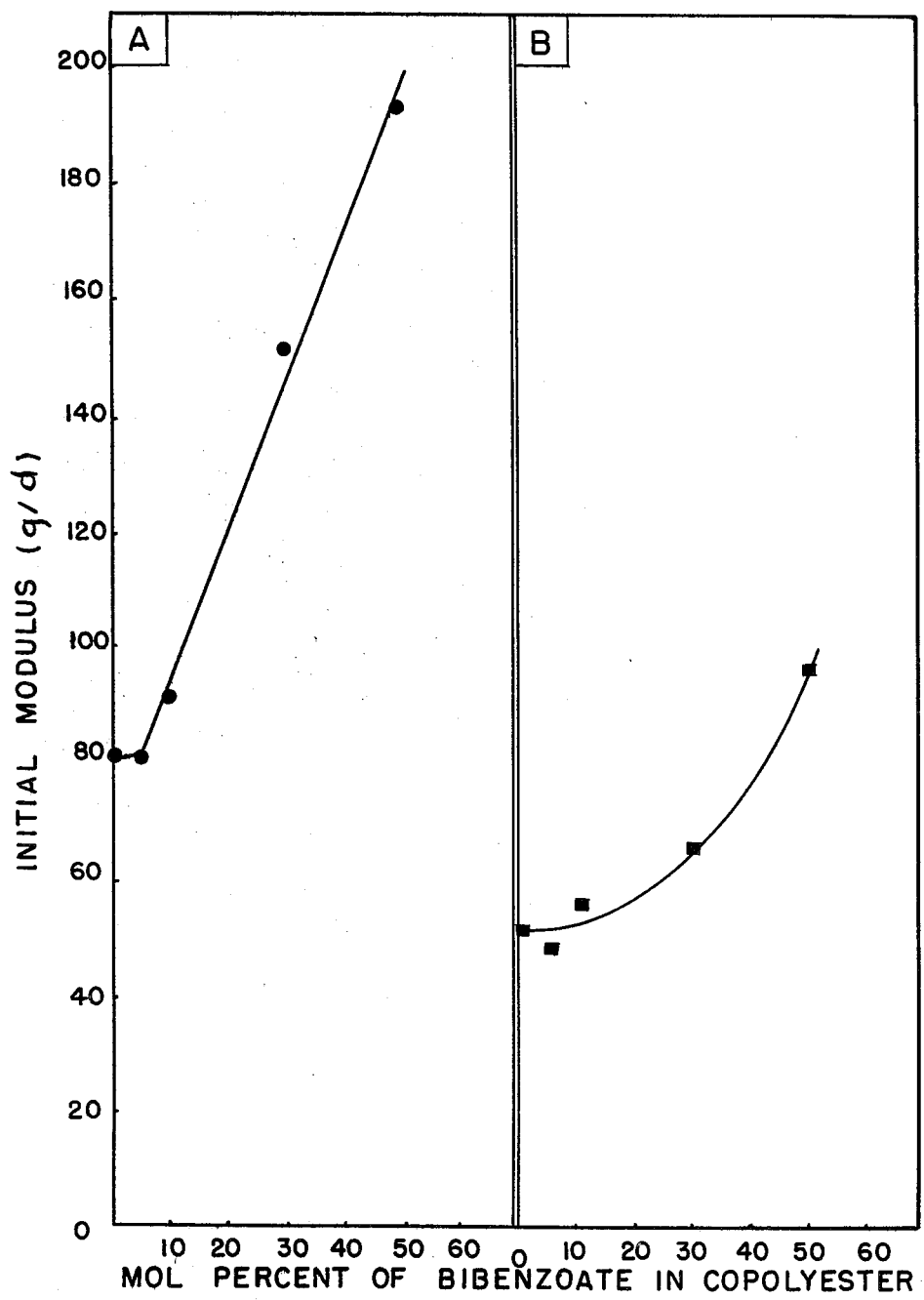

In the drawing:

FIG. 1 of the drawing represents typical stress-strain diagrams of various drawn copolyester fibers described herein: (A) before and (B) after heat-setting in a free-to-relax state;

FIG. 2 of the drawing represents initial modulus curves for various drawn copolyester fibers described herein: (A) before and (B) after heat-setting in a free-to-relax state; and FIG. 3 of the drawing represents tenacity curves for various drawn copolyester fibers described herein: (A) before and (B) after heat-setting in a free-to-relax state.

The following examples are set forth to demonstrate this invention.

EXAMPLES I - X

Resin preparation was accomplished by transesterifying predetermined quantities of dimethyl terephthalate, diethyl bibenzoate and ethylene glycol in the presence of a catalyst, followed by polycondensation at elevated temperatures under vacuum. When the polycondensation was finished, the resin was spun into yarn containing 10 filaments.

Yarn processing was accomplished by drawing the yarn at a temperature of about 20° C. higher than its glass transition temperature, at 75% of its break-draw ratio and then heat-setting the yarn while completely relaxed.

In FIG. 1 of the drawing, stress-strain curves for various fibers are shown. Curve 1 is for the fiber of Example I, a homopolymer of ethylene terephthalate having an I.V. of 0.6, a tenacity of 3.57 g./d. and an initial modulus of 49.1 g./d. after heat-setting.

Curve 2 is of the fiber of Example III, a copolymer of 95 mole % ethylene terephthalate units and 5 mole % of ethylene bibenzoate units having an I.V. of 0.52, a tenacity of 3.15 g./d. and an initial modulus of 54.4 g./d. after heat-setting.

Curve 3 of the fiber of Example V, a copolymer of 10 mole % of ethylene terephthalate units and 10 mole % of ethylene bibenzoate units having an I.V. of 0.53, a tenacity of 3.05 g./d. and an initial modulus of 54.9 g./d. after heat-setting.

Curve 4 is of the fiber of Example VIII, a copolymer of 70 mole % of ethylene terephthalate units and 30 mole % of ethylene bibenzoate units having an I.V. of 0.65, a tenacity of 3.61 g./d. and an initial modulus of 63.0 g./d. after heat-setting.

Curve 5 is of the fiber of Example X, a copolymer of 50 mole % of ethylene terephthalate units and 50 mole % of ethylene bibenzoate units having an I.V. of 0.65, a tenacity of 4.17 g./d. and an initial modulus of 93.9 g./d. after heat-setting.

It can be seen from FIG. 1, graphs A and B, that the initial moduli, (as represented by the stress-strain curves) of the fibers of this invention, (curves 4 and 5) are much higher both before and after heat-setting, while fibers which do not come within the parameters of this invention, (curves 1, 2 and 3) have relatively lower initial moduli.

It can be seen from FIG. 2 that a significant desirable change in initial moduli, after heat-setting while free-to-relax, does not occur until at least 15 mole % of bibenzoate units are present in the polymer chain.

FIG. 3 shows that molecular weight as measured by intrinsic viscosities (I.V.) has a distinct influence on the tenacity of the fibers, as would be expected since shorter polymer chains have less strength. Specifically, an I.V. of at least 0.55 is required so as to produce yarn which has at least as high tenacity as yarn of the homopolymer.

The chemical and physical properties of these yarns are summarized in Tables I and II below.

Various changes and modifications may be made in practicing the invention without departing from the spirit and scope thereof and; therefore, the invention is not to be limited except as defined in the appended claims.

TABLE I

Chemical and Thermal Properties of Bibenzoic Acid Copolyester Fibers

| Example | BBA* | I.V. | FREE $CO_2H$ (meq.$^z$/kg.) | TOTAL $CO_2H$ (meq.$^z$/kg.) | DEG** (%) | $T_g(1)$ (°C) | $T_c(2)$ (°C) | $T_m(3)$ (°C) |
|---------|------|------|---------|----------|------|-------|-------|-------|
| I | 0 | 0.60 | 24 | — | 0.60 | 69 | 150 | 260 |
| II | 5 | 0.68 | 62 | 9980 | 1.40 | 71 | 144 | 243 |
| III | 5 | 0.52 | 52 | 9985 | 1.13 | 81 | 152 | 249 |
| IV | 10 | 0.55 | 59 | 9880 | 1.11 | 77 | 155 | 227 |
| V | 10 | 0.53 | 31 | 9800 | 0.65 | 83 | 174 | 236 |
| VI | 15 | 0.46 | 57 | 9235 | 1.10 | 79 | 164 | 225 |
| VII | 30 | 0.39 | 17 | 9165 | 0.68 | 79 | 187 | 204 |
| VIII | 30 | 0.65 | 21 | 9010 | 1.24 | 83 | ND*** | ND*** |
| IX | 50 | 0.36 | 20 | 7875 | 0.59 | 86 | 113 | 224 |
| X | 50 | 0.65 | 22 | 8510 | 1.32 | 95 | 121 | 224 |

*BBA-Bibenzoic Acid;
**DEG-Diethylene glycol;
***ND-Not detected when analyzed by differential thermal analysis
$T_g$-Glass transition temperature;
(2)$T_c$-Minimum crystallization temperature;
(3)$T_m$-Melt temperature

TABLE II

Physical Properties of Drawn Copolyester Yarns Containing Various Amounts of Bibenzoic Acid - Before and After Heat-Setting

| Example | Mol % BBA | BDR[1] | DT[2] (° F) | Ten.(g./d.) BHS[3] | Ten.(g./d.) AHS[4] | Break Elongation (%) BHS | Break Elongation (%) AHS | Initial Modulus (g./d.) BHS | Initial Modulus (g./d.) AHS | Breaking Energy (g-cm/cm/d) BHS | Breaking Energy (g-cm/cm/d) AHS |
|---|---|---|---|---|---|---|---|---|---|---|---|
| I | 0 | 4.3 | 192 | 4.34 | 3.57 | 60.0 | 85.2 | 80.4 | 49.1 | 1.70 | 1.91 |
| II | 5 | 5.7 | 196 | 3.62 | 3.26 | 68.3 | 91.2 | 80.6 | 46.5 | 1.70 | 2.12 |
| III | 5 | 5.5 | 214 | 4.32 | 3.15 | 57.1 | 74.6 | 101.0 | 54.4 | 1.71 | 1.62 |
| IV | 10 | 5.1 | 207 | 3.93 | 3.16 | 54.6 | 83.1 | 91.1 | 53.1 | 1.51 | 1.74 |
| V | 10 | 5.5 | 218 | 3.65 | 3.05 | 71.5 | 83.5 | 75.9 | 54.9 | 1.79 | 1.76 |
| VI | 15 | 5.4 | 210 | 2.94 | 2.43 | 76.3 | 93.4 | 72.1 | 54.3 | 1.55 | 1.65 |
| VII | 30 | 6.5 | 210 | 2.49 | 2.11 | 24.4 | 21.1 | 132.9 | 114.3 | .48 | .37 |
| VIII | 30 | 6.7 | 218 | 5.42 | 3.61 | 23.9 | 58.1 | 145.4 | 63.0 | .91 | 1.27 |
| IX | 50 | 4.3 | 223 | 1.33 | 1.30 | 27.7 | 3.7 | 108.4 | 94.7 | — | — |
| X | 50 | 7.5 | 239 | 7.07 | 4.17 | 12.4 | 33.1 | 191.2 | 93.9 | .57 | .91 |

[1]Break Draw Ratio;
[2]Drawing Temperature (Input Godet & Platents; Output Godet at Room Temperature)
[3]Before Heat-Setting;
[4]After Heat Setting
Note: All yarns were drawn at 75% of their BDR[1] and heat-set for 3 minutes at 130° C (in the relaxed state).

What is claimed is:

1. Method for producing a high modulus yarn from a copolyester resin which yarn is heat-settable without tension comprising:
    a. forming filaments from a copolyester resin consisting of at least 15 to 50 mole percent of an interpolymerized randomly repeating unit having the formula:

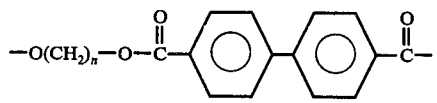

and from 85 to 50 percent of an interpolymerized randomly repeating unit having the formula:

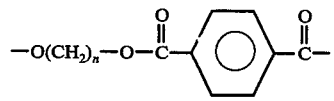

wherein $n$ for both units is an integer of from 2 to 10, the fiber resin having an intrinsic viscosity of at least about 0.55 as determined in a 60 weight percent phenol and 40 weight percent tetrachloroethane solution at 30° C;
    b. combining the resulting filaments into a yarn;
    c. uniformly orienting the resulting yarn by drawing the yarn at a temperature of about 20° C higher than its glass transition temperature and at 75% of its break-draw ratio, and
    d. heat-setting the oriented yarn by passing it through a heat zone maintained about 125° to 185° C for a time ranging from 1 to 10 minutes, while in a free-to-relax condition, said heat-setting being conducted without tensioning of said yarn.

2. The method of claim 1 wherein the copolyester resin consists of 25 to 40 mole percent of said first-mentioned unit and from 75 to 60 mole percent of said second-mentioned unit.

3. The method of claim 1 wherein the copolyester resin consists of repeating units wherein $n$ is an integer of from 2 to 4.

4. The method of claim 3 wherein $n$ is 2.

5. The method of claim 4 wherein the copolyester resin consists of 25 to 40 mole percent of said first-mentioned unit and from 75 to 60 mole percent of said second-mentioned unit, and said resin has an intrinsic viscosity of at least 0.6.

6. The method of claim 1 wherein the copolyester resin contains up to 5 mole percent of a third randomly repeating ester unit.

7. The method of claim 1 in which the resulting yarn is in the form of staple fibers.

8. A high modulus copolyester yarn produced according to the method of claim 1.

9. The copolyester yarn of claim 8 wherein the copolyester resin consists of 25 to 40 mole percent of said first-mentioned unit, and from 75 to 60 mole percent of said second-mentioned unit, and said resin has an intrinsic viscosity of at least 0.6.

10. The copolyester yarn of claim 8 wherein the copolyester resin consists of repeating units wherein $n$ is an integer of 2 to 4.

11. The high modulus copolyester yarn of claim 8 wherein the resin contains up to 5 mole percent of a third randomly repeating ester unit.

12. The high modulus copolyester yarn of claim 8 in which the resulting yarn is in the form of staple fibers.

* * * * *

UNITED STATES PATENT AND TRADEMARK OFFICE
CERTIFICATE OF CORRECTION

PATENT NO. : 4,082,731
DATED : April 4, 1978
INVENTOR(S) : WILLIAM N. KNOPKA

It is certified that error appears in the above-identified patent and that said Letters Patent are hereby corrected as shown below:

Table I should appear as follows:

Chemical and Thermal Properties of Bibenzoic Acid Copolyester Fibers

| | | | Chemical | | | Thermal | | |
|---|---|---|---|---|---|---|---|---|
| Example | BBA* | I.V. | FREE $CO_2H$ (meq./kg.) | TOTAL $CO_2H$ (meq./kg.) | DEG** ( % ) | $T_g$ (1) (°C) | $T_c$ (2) (°C) | $T_m$ (3) (°C) |
| I | 0 | 0.60 | 24 | -- | 0.60 | 69 | 150 | 260 |
| II | 5 | 0.68 | 62 | 9980 | 1.40 | 71 | 144 | 243 |
| III | 5 | 0.52 | 52 | 9985 | 1.13 | 81 | 152 | 249 |
| IV | 10 | 0.55 | 59 | 9880 | 1.11 | 77 | 155 | 227 |
| V | 10 | 0.53 | 31 | 9800 | 0.65 | 83 | 174 | 236 |
| VI | 15 | 0.46 | 57 | 9235 | 1.10 | 79 | 164 | 225 |
| VII | 30 | 0.39 | 17 | 9165 | 0.68 | 79 | 187 | 204 |
| VIII | 30 | 0.65 | 21 | 9010 | 1.24 | 83 | ND*** | ND*** |
| IX | 50 | 0.36 | 20 | 7875 | 0.59 | 86 | 113 | 224 |
| X | 50 | 0.65 | 22 | 8510 | 1.32 | 95 | 121 | 224 |

\* BBA-Bibenzoic Acid;
\*\* DEG-Diethylene glycol;
\*\*\* ND-Not detected when analyzed by differential thermal analysis.
(1) $T_g$-Glass transition temperature; (2) $T_c$-Minimum crystallization temperature; (3) $T_m$-Melt temperature.

Signed and Sealed this

Thirty-first Day of October 1978

[SEAL]

Attest:

RUTH C. MASON
Attesting Officer

DONALD W. BANNER
Commissioner of Patents and Trademarks